Patented Apr. 7, 1936

2,036,300

UNITED STATES PATENT OFFICE 2,036,300

PIGMENTED COATING COMPOSITION

Ernest Rodman, Marshallton, Del., assignor to E. I. du Pont de Nemours & Company, Wilmington, Del., a corporation of Delaware No Drawing. Application August 23, 1933, Serial No. 686,369

1 Claim. (Cl. 134—39)

This invention relates to pigmented coating compositions and, more particularly, to coating compositions comprising a liquid non-volatile polymer of acetylene vehicle and a treated pigment.

Liquid non-volatile polymers of acetylene which have substantially the properties of drying oils are known. The preparation of such synthetic drying oils is fully disclosed in U. S. Patent 1,812,849, issued to A. M. Collins.

As pigmented coating compositions have ordinarily been prepared from liquid non-volatile polymer of acetylene vehicles, the pigments have been distributed or dispersed in the coating compositions by various means known to the art to a degree satisfactory from a practical standpoint as far as immediate application of the coating compositions is concerned. However, after standing for a period of time, such compositions have exhibited a tendency for the sedimentation of the pigment. This phenomena develops eventually to the point when the pigment becomes massed and tough with the ageing of the composition, so that finally the hardness and dryness of the settled pigment makes it extremely difficult to reincorporate in the composition to anywhere near the degree of dispersion existing originally. In some cases the pigment cake so formed can be redispersed to a degree where the composition can be used, but this operation requires a considerable expenditure of energy and time and, as a rule, it is difficult to obtain the original degree of dispersion without resorting to regrinding.

Experience has shown that frequently a comparatively large percentage of the pigment cannot be readily redispersed, by stirring alone, to a quality satisfactory to the consumer. An inferior quality results because the covering power is decreased, lumpy particles are present in the film, and offtints in the case of colors are encountered. Such a condition existing in paint products constitutes a serious and objectionable feature. The tendency for the formation of hard cake in the manner set forth varies with the pigment and also to some extent with the different types of liquid non-volatile polymers of acetylene used as the vehicle. It has been found that in certain instances it is possible to select particular pigments and pigment combinations which do not hard cake to an extreme degree in the normal shelf life of the product, but pigmentation is not always a matter of free choice and it is often necessary to employ pigments which have a decided tendency to hard cake, in order to obtain certain necessary or desirable characteristics in the final products. Such a case may be illustrated by a paint comprising silica pigment in a vehicle containing a liquid non-volatile polymer of acetylene, which paint is very useful in protecting surfaces under extremely corrosive conditions. The combination of high density pigments, pigments of large average particle size, or pigments of an abnormal hard caking tendency, with a low viscosity vehicle comprising a liquid non-volatile polymer of acetylene, represents a system which frequently develops a maximum in hard caking.

The importance of preventing hard caking, with subsequent non-uniform redispersion of pigment in the vehicle, can be realized from the fact that a film deposited from a pigmented paint containing a liquid non-volatile polymer of acetylene vehicle is less resistant to corrosive agents than an unpigmented film. If lumps of undispersed pigment remain in the paint, upon application, areas of low corrosion resistance are formed which permit the entrance of corrosive agents, eventually undermining the film and destroying the surface coating. Although clear films of the liquid non-volatile polymer of acetylene compositions herein under consideration afford more corrosion resistance than pigmented films, it has been found desirable to apply more than one coat of this type of composition, and better adhesion is obtained between the paint and the surface to be coated and also between the multiple coats of the paint if the coating composition contains some pigment It will be understood by those skilled in the art that mere sedimentation or tendency to deposition of pigment particles that can be easily remedied by stirring is not here under discussion, but rather a deposition or settling of the pigment which results in the formation of a hard cake that is very difficult to reincorporate with the vehicle.

Heretofore various agents have been disclosed to prevent the hard caking of pigments in ordinary paint vehicles. There is, however, so far as applicant knows, no disclosure in the prior art of the use of these agents in a vehicle comprising liquid non-volatile polymers of acetylene. Further, experimentation has shown that the conclusions drawn with respect to agents for ordinary paint vehicles cannot be expanded beyond the field of such vehicles to include vehicles comprising a liquid non-volatile polymer of acetylene, since the use of this latter type of vehicle leads to unexpected results. For example, rubber "sweated" on to the pigment from a xylene solution is an excellent inhibitor of hard caking in cellulose nitrate lacquers and certain orthodox paint systems, but is not at all suited for use in paints containing a liquid non-volatile polymer of acetylene. Further, the use of rubber in compositions of the type herein under discussion gives rise to a highly objectionable increase in "body" of the coating composition, the resulting consistency being such that the composition can be applied only with great difficulty.

An object of the present invention is to provide stable pigmented coating compositions containing a liquid non-volatile polymer of acetylene vehicle, whereby the difficulties discussed above may be largely eliminated. A further object is to provide a simple and economical method of treating pigments to cause them to remain dispersed for longer periods of time in vehicles of this type. Other objects will be apparent from the description of the invention given hereinafter.

The above objects are accomplished according to the present invention by depositing a film of a suitable protective agent on the individual particles of the pigment to be used in a liquid non-volatile polymer of acetylene vehicle.

In order to illustrate the invention several specific examples are given below. In each of these examples the polymer of acetylene employed was that obtained in accordance with Example 1 of U. S. Patent 1,812,849, except that the divinyl acetylene was boiled in the absence of air to avoid oxidation and any instability of the polymer that might result therefrom. This method of preparing the polymer is as follows: 100 grams of pure divinyl acetylene are boiled at atmospheric pressure and in the absence of air for 4 hours in a vessel provided with a condenser for the return of the condensed vapors to the reaction. The temperature of the boiling liquid is between 85° and 90° C. At the end of 4 hours the unchanged divinyl acetylene is distilled off under reduced pressure. There remains, in 12–18% yield, a viscous, non-volatile residue having the general properties of a bodied drying oil and consisting of the polymerized divinyl acetylene.

In the examples, proportions are given by weight and the acetylene polymer is added as such, although, if desired, part of the solvent may be used to thin out the polymer before addition to the pigment, in which case a corresponding decrease in the amount of solvent first mixed with the pigment will be made.

*Example 1.*—This example relates to the preparation of a silica pigment-asbestine paint in which the hard-caking tendencies have been overcome by means of stearic acid. The treated pigment for such a paint is prepared as follows:

| | Parts |
|---|---|
| Silica pigment | 44.7 |
| Asbestine | 14.9 |
| Stearic acid | 0.6 |
| Solvent naphtha | 19.9 |

The above ingredients were placed in a pebble mill with 100 parts of pebbles, the air within the pebble mill replaced with carbon dioxide, and the batch milled for three hours. The mill was then opened, 19.9 parts of acetylene polymer added to the base, the air again replaced with carbon dioxide before closing, and the batch then milled for 20 more hours. The product was a paint which after standing for 6 months or more could readily be redispersed, whereas without this treatment, the pigment, after the paint had stood for two weeks, could be redispersed only with extreme difficulty. The paint is useful in protecting metal, wood, concrete, and other materials.

*Example 2.*—This example relates to the preparation of a paint based on silica pigment, essentially free from hard-caking properties. The treated pigment was prepared as follows:

| | Parts |
|---|---|
| Silica pigment | 55.6 |
| Octadecyl alcohol | 0.28 |
| Solvent naphtha | 22.2 |

The above ingredients were placed in a pebble mill with 100 parts of pebbles and milled for two hours. The mill was then opened and 22.2 parts of acetylene polymer added to the batch. The air in the mill was replaced with nitrogen, the mill closed, and milling continued for 24 hours. The product was a paint particularly resistant to corrosive action by acids and could readily be redispersed after standing for at least four times as long as the untreated paint.

*Example 3.*—This example relates to the preparation of a barium base titanium dioxide pigmented paint in which the hard caking tendencies have been overcome by the use of lead soap of sulphonated castor oil, applied to the pigment as follows:

| | Parts |
|---|---|
| Barium base titanium dioxide pigment | 45 |
| Asbestine | 15 |
| Lead soap of sulphonated castor oil | 0.3 |
| Solvent naphtha | 100 |

The above ingredients were placed in a suitable container and stirred for five hours. The product was then subjected to distillation, 80 parts of solvent naphtha removed, the mass then cooled and transferred to a ball mill, and 20 parts of acetylene polymer added. The air in the mill was displaced by carbon dioxide and the batch milled for 20 hours. The pigment in this product has very little tendency to settle and form a hard cake.

*Example 4.*—This example relates to the preparation of a blue paint in which the hard caking of the pigment was prevented by means of stearin pitch, a tar-like material, well known in the trade, which may be considered as crude stearic acid. (The expression "long chain fatty acid", as used in the claim, is intended to include this substance).

| | Parts |
|---|---|
| Silica pigment | 44.65 |
| Asbestine | 14.85 |
| Indigo | 0.6 |
| Stearin pitch | .15 |
| Solvent naphtha | 19.85 |

The ingredients were ground in the ball mill for three hours, after which time 19.9 parts of acetylene polymer were added. The air in the mill was replaced with carbon dioxide and the batch milled for 24 hours. The product was a dark blue paint with good covering characteristics, suitable for protecting equipment against corrosive agents, as well as having a decorative effect. It could be redispersed with extreme readiness even after eight months, whereas the untreated product could be reimbursed only with the greatest difficulty after two weeks.

*Example 5.*—This example relates to the preparation of a paint in which the pigment is rendered non-caking by the use of the sodium soap of sulphonated petroleum oil:

| | Parts |
|---|---|
| Silica pigment | 44.68 |
| Asbestine | 14.96 |
| Sodium soap of sulphonated petroleum oil | .30 |
| Hi-flash naphtha | 19.94 |

The above ingredients were placed in the ball mill and milled for four hours. After this time 19.49 parts of acetylene polymer were added to the mass in the mill, the air in the mill replaced with nitrogen, the mill closed and the milling continued for 20 hours, or until a proper degree of dispersion was obtained. The pigment in the resulting paint remains more permanently dispersed than the untreated pigment.

*Example 6.*—This example relates to the preparation of a paint in which the pigments have been rendered non-caking by the use of stearic acid. The pigments were treated as indicated below:

| | Parts |
|---|---|
| Asbestine | 13.65 |
| Barytes | 13.45 |
| Blanc fixe | 27.80 |
| Stearic acid | 2.0 |
| Turpentine | 22.15 |

The above ingredients were placed in a ball mill and milled for three hours. The mill was then opened and 22 parts of acetylene polymer dissolved in six parts of solvent naphtha added to the mass already in the mill. The atmosphere in the mill was substantially replaced with nitrogen, the mill closed and the mass milled for 30 hours.

*Example 7.*—This example relates to the use of castor oil acid phthalate as an agent to prevent hard caking of the pigment. Castor oil acid phthalate is a reaction product of 1 mol of castor oil* and 3 mols of phthalic anhydride. (*Castor oil considered as glyceryl triricinoleate.)

| | Parts |
|---|---|
| Red lead | 45 |
| Asbestine | 15 |
| Castor oil acid phthalate | 0.3 |
| High boiling coal tar naphtha | 20.0 |

The above ingredients were placed in the ball mill with 200 parts of pebbles and milled for three hours. The mill was then opened and 20 parts of acetylene polymer added to the mill base. The atmosphere in the mill was replaced with nitrogen substantially free from oxygen, the mill closed and milling continued for 20 hours. The resulting paint was substantially non-caking.

It is to be understood that the above examples are merely illustrative of specific embodiments of the invention which broadly resides in the production of a coating composition comprising a liquid non-volatile polymer of acetylene vehicle and pigment particles having a film upon their surfaces of an agent from the group consisting of long chain fatty acids, long chain aliphatic alcohols (especially those fatty alcohols derived from long chain fatty acids by carboxyl hydrogenation), sulfonated fatty and mineral oils, and soaps of sulfonated fatty and mineral oils.

By the term "long chain fatty acids" is meant those acids having a chain of twelve or more carbon atoms. Among these acids stearic acid has been found to be exceptionally well adapted for the preparation of stable acetylene polymer paints. Oleic, palmitic, ricinoleic, montanic, lauric, myristic, margaric, and melissic acids may also be mentioned as particularly suitable compounds of this class.

As typical of the long chain aliphatic alcohols which are especially suitable for this invention may be mentioned: octadecyl, dodecyl, 9,10-octadecynl, octyl, cetyl, carnaubyl, melissyl, citronellyl, geranyl, linalyl, octadecane-di-ol (from ricinoleic acid, decamethylene glycol, dibutylene glycol, monobutyl ether of glycerol, et cetera. Many of these alcohols, (e. g., octadecyl, dodecyl, 9,10-octadecynl), are conveniently obtained by carboxyl hydrogenation of the corresponding fatty acid. By "long chain aliphatic alcohols" is meant monohydric or dihydric alcohols having a chain of at least eight carbon atoms. Certain other polyhydric alcohols also have some effect in producing more permanent acetylene polymer paints, e. g., ethylene glycol, diethylene glycol, glycerol, monoethylene, etc. These, however, are definitely less preferred, since the length of the chain seems to be significant.

Among the sulfonated fatty and mineral oils well suited for the purposes of the present invention are sulfonated fish oil, sulfonated castor oil, sulfonated cod oil and sulfonated petroleum oil, sulfonated cottonseed oil, sulfonated cocoanut oil, et cetera. The soaps of these oils include the sodium, aluminum, lead, calcium, cobalt, manganese, barium, etc., soaps.

It will be apparent that the present invention is broadly applicable to all pigments, although pigments that have a strong tendency to hard cake are most effectively treated. Silica pigments and titanium oxide pigments are examples of pigments notorious for their hard caking tendencies, and it is with these pigments that the advantages of the invention are most marked. Although the present invention is directed to coating compositions having a vehicle comprising a liquid non-volatile polymer of acetylene, and in the examples one specific form of polymer was employed, it has been found that the invention is equally well adapted for all the various modifications of acetylene polymer vehicles. The preparation of such vehicles is fully disclosed in U. S. Patent 1,812,849.

To accomplish the purpose of this invention it is merely necessary to deposit a film of the protective agent on the pigment particles, the particular method of so doing being capable of many and wide variations. The pigment particles may be coated with the agent by association with the agent, either in a water slurry, or by treating the pigment with a solution of the agent in a suitable solvent, followed by drying and incorporation with the vehicle. It is more effective to incorporate the treated pigment in the vehicle rather than adding the agent to the already prepared paint composition. With respect to proportion of agent to be employed, it will be appreciated by those skilled in the art that the type of pigment and agent used will considerably vary the optimum proportions. It has been found that usually the agent should amount to about 0.25% to 4.0% by weight of the pigment, although it is not desired to so limit the invention, as the use of greater or less amounts of agent will materially decrease hard caking of the pigment and, in particular combinations of pigment and agent, the optimum proportions may even be outside the indicated range. Instead of using a single agent a mixture of agents may be employed and this will ordinarily be done with the long chain fatty acids and alcohols derived therefrom, since these acids are obtained from fatty oils and the separation of the individual acids or alcohols is difficult.

It has been found that agents suitable for producing stable paints from one type of vehicle may be entirely unsuited for use in another, and that suitable agents for a particular vehicle can be ascertained only by test. This is especially true in the case of acetylene polymer vehicles, which differ so radically from ordinary paint vehicles, both in their chemical constitution and physical properties. By treating the pigment as herein described it is put in a condition so that it will not form the hard tough mass so resistant to attempts to disperse it again into the vehicle. This represents a great advantage, since paints frequently are not used until a period has elapsed sufficient to allow the formation of a hard mass that cannot be redispersed satisfactorily by ordinary means. The use of such common agents as rubber, e. g., smoked sheets, causes a thickening of the vehicle, resulting in high viscosity and subsequent "stringiness". Highly milled rubber has no beneficial effect. Chlorbutadiene polymer is likewise without effect. It will thus be seen that the production of stable acetylene polymer vehicle types of paints presents a radically different problem from the manufacture of similar paints from ordinary vehicles, and that the present invention represents a substantial and valuable contribution to this art.

The advantages of stearic acid as the treating agent are particularly outstanding. Not only does this agent put the treated pigment in a condition so that it will not form a hard, tough mass, but acetylene polymer paints containing stearic acid treated pigments give films of improved durability, such films not showing the checking and cracking on prolonged exposure to the atmosphere that the films otherwise would show if the pigment were not treated with stearic acid.

As many apparently widely different embodiments of this invention may be made without departing from the spirit and scope thereof, it is to be understood that the invention is not limited to the specific embodiments thereof except as defined in the appended claim.

I claim:

A coating composition comprising a liquid, relatively non-volatile polymer of acetylene vehicle and a pigment composition consisting of approximately 15 parts of asbestine, approximately 13 parts of barytes and approximately 28 parts of blanc fixe, said composition having approximately 2 parts of stearic acid disposed on the pigment particles by a pretreatment.

ERNEST RODMAN.